(12) United States Patent
Monden et al.

(10) Patent No.: US 12,421,423 B2
(45) Date of Patent: Sep. 23, 2025

(54) POLISHING METHOD, MACHINE DEVICE MANUFACTURING METHOD, AND MACHINE DEVICE

(71) Applicant: SHOWA DENKO K.K., Tokyo (JP)

(72) Inventors: Ryuji Monden, Tokyo (JP); Kunio Kondo, Tokyo (JP)

(73) Assignee: MITSUBISHI CORPORATION, Tokyo (JP)

( * ) Notice: Subject to any disclaimer, the term of this patent is extended or adjusted under 35 U.S.C. 154(b) by 669 days.

(21) Appl. No.: 17/757,384

(22) PCT Filed: Apr. 27, 2020

(86) PCT No.: PCT/JP2020/017953
§ 371 (c)(1),
(2) Date: Jun. 15, 2022

(87) PCT Pub. No.: WO2021/124597
PCT Pub. Date: Jun. 24, 2021

(65) Prior Publication Data
US 2023/0033337 A1    Feb. 2, 2023

(30) Foreign Application Priority Data

Dec. 20, 2019   (JP) .................. 2019-230213

(51) Int. Cl.
*C09G 1/02*        (2006.01)
*C09K 3/14*        (2006.01)

(52) U.S. Cl.
CPC .............. *C09G 1/02* (2013.01); *C09K 3/1409* (2013.01)

(58) Field of Classification Search
CPC ...... C09G 1/02; C09K 3/1409; C09K 3/1463; C10M 2201/041; C10M 2207/2835; C10M 125/02; C10N 2020/06; C10N 2030/06; C10N 2040/22; B24B 37/044; C01B 32/156

See application file for complete search history.

(56) References Cited

U.S. PATENT DOCUMENTS

2006/0130409 A1   6/2006   Chen
2019/0382618 A1   12/2019  Takai et al.

FOREIGN PATENT DOCUMENTS

| CN | 107699140 A | * | 2/2018 | ................ C08J 5/00 |
| EP | 3418576 | | 12/2018 | |
| JP | 2005-146036 | | 6/2005 | |
| JP | 2005146036 A | * | 6/2005 | ............. B82Y 30/00 |
| JP | 2005-223278 | | 8/2005 | |
| JP | 2005-320475 | | 11/2005 | |

(Continued)

OTHER PUBLICATIONS

JP_2005146036_A_Machine_Translation (Year: 2005).*

(Continued)

*Primary Examiner* — Amber R Orlando
*Assistant Examiner* — Anastasia A. Kuvayskaya
(74) *Attorney, Agent, or Firm* — IPUSA, PLLC (57) ABSTRACT

One aspect of the present invention provides a polishing method including polishing a sliding part of a machine device by producing fullerene-aggregated particles by making the sliding part slide while a polishing-agent composition containing fullerenes and a solvent of the fullerenes is applied to the sliding part.

8 Claims, 2 Drawing Sheets

(56) References Cited

FOREIGN PATENT DOCUMENTS

| | | | |
|---|---|---|---|
| JP | 2008-266501 | 11/2008 | |
| JP | 2011-068899 | 4/2011 | |
| JP | 4969074 B2 * | 7/2012 | ............ C01B 31/02 |
| JP | 2015013325 A * | 1/2015 | ............ B24B 37/26 |
| JP | 2018-168356 | 11/2018 | |
| WO | 2007/020939 | 2/2007 | |
| WO | WO-2007020939 A1 * | 2/2007 | ............ B24B 37/04 |
| WO | 2015/001939 | 1/2015 | |

OTHER PUBLICATIONS

WO 2007020939 A1_Machine Translation (Year: 2007).*
JP 4969074_Machine Translation (Year: 2012).*
CN 107699140_Machine Translation (Year: 2018).*
Li et al. Superstructured assembly of nanocarbons: fullerenes, nanotubes, and graphene. Chemical Reviews, 115, pp. 7046-7117 (Year: 2015).*
JP 2015013325 A_Machine Translation (Year: 2015).*
International Search Report of Int. Appl. No. PCT/JP2020/017953 dated Jul. 7, 2020.

* cited by examiner

FIG.1

POLISHING METHOD, MACHINE DEVICE MANUFACTURING METHOD, AND MACHINE DEVICE

TECHNICAL FIELD

The present invention relates to a polishing method, a machine device manufacturing method, and a machine device.

BACKGROUND ART

A fullerene may be used as a polishing-agent component or as a lubricant component.

For example, Patent Document 1 discloses a polishing slurry that is for use for polishing conductors or metals, the polishing slurry characteristically containing water and a fullerene or a fullerene derivative, and the particle size of the fullerene or the fullerene derivative being less than 100 nm.

Furthermore, Patent Document 2 discloses a lubricating oil composition that contains a base oil and a fullerene, and that contains, per 10 ml, less than one particle having a major axis of 1 µm or more.

RELATED-ART DOCUMENTS

Patent Documents

[Patent Document 1] International Publication No. WO2007/020939
[Patent Document 2] Japanese Unexamined Patent Application Publication No. 2018-168356

SUMMARY OF THE INVENTION

Problem to be Solved by the Invention

In this way, a fullerene may be used both as a polishing-agent component and as a lubricant component. Generally, when used as a polishing-agent component, a fullerene preferably assumes the form of hard, aggregated particles. A fullerene that exists in a solvent as in the form of aggregated particles change its state over time, and thus it is difficult to keep aggregated particles that are suitable as a polishing-agent component in a stable state.

It is therefore an object of the present invention to provide a polishing method for stably polishing a sliding part of a machine device having the sliding part, a method for manufacturing the machine device, and the machine device.

Means of Solving the Problem

The present invention provides the following means for solving the above problem.
  [1] A polishing method including polishing a sliding part of a machine device by producing fullerene-aggregated particles by making the sliding part slide while a polishing-agent composition containing fullerenes and a solvent of the fullerenes is applied to the sliding part.
  [2] The polishing method according to above [1], wherein the solvent is mineral oil or chemically-synthesized oil.
  [3] The polishing method according to above [1] or [2], wherein a concentration of the fullerenes in the polishing-agent composition is 1/50 to 1/1 of saturating solubility.
  [4] The polishing method according to any one of above [1] to [3], wherein the polishing-agent composition contains the fullerene-aggregated particles only after the polishing is started.
  [5] The polishing method according to any one of above [1] to [4], wherein a concentration of the fullerenes in the polishing-agent composition is adjusted such that, while the polishing is in progress, the fullerene-aggregated particles are produced where a surface roughness of the sliding part is greater than a target value and not produced where the surface roughness of the sliding part is less than or equal to the target value.
  [6] The polishing method according to any one of above [1] to [5], wherein, after the polishing is started, the polishing is performed until the fullerene-aggregated particles are no longer produced in the polishing-agent composition.
  [7] The polishing method according to any one of above [1] to [4], wherein the polishing is finished by diluting the polishing-agent composition applied to the sliding part, with a diluting solvent, and reducing the concentration of the fullerenes.
  [8] The polishing method according to above [7], wherein the diluting solvent is same as a solvent contained in the polishing-agent composition.
  [9] The polishing method according to any one of above [1] to [8], wherein a material of the sliding part contains a resin.
  [10] The polishing method according to any one of above [1] to [9], wherein the material of the sliding part contains a metal.
  [11] A machine device manufacturing method including performing polishing based on the polishing method according to any one of above [1] to [10].
  [12] A machine device including a sliding part, wherein a polishing-agent composition containing fullerenes and a solvent of the fullerenes is applied to the sliding part,
  wherein, while the sliding part slides, polishing is performed based on the polishing method according to above [5] or [6], and
  wherein, upon finishing the polishing, the polishing-agent composition is in a state for use as lubricating oil for the sliding part.

Effects of the Invention

According to the present invention, a sliding part of a machine device having the sliding part can be polished stably.

MODE OF CARRYING OUT THE INVENTION

Hereinafter, an embodiment of the present invention will be described in detail. Note that the following embodiment will be described in detail in order to help understand the gist of the present invention better, and are not intended to limit the present invention in any way, unless otherwise specified.

(Polishing Method)

According to the polishing method of the present embodiment, a polishing-agent composition containing fullerenes and a solvent of the fullerenes is applied to a sliding part of a machine device having the sliding part, and, by sliding the sliding part in this state, fullerene-aggregated particles are produced, and the sliding part is polished.

(Fullerene-Aggregated Particles)

By sliding the sliding part, fullerene-aggregated particles that might serve as polishing-agent particles are produced in the polishing-agent composition. This is likely to be because, when pressure is applied between two opposing surfaces of the sliding part, the fullerenes in the polishing-agent composition undergo pressure crystallization, and produce fullerene-aggregated particles. If the concentration of fullerenes in the polishing-agent composition is less than saturating solubility, the fullerene-aggregated particles that are produced will eventually re-dissolve and disappear. These are also confirmed in the reference examples that will described later herein.

Fullerene-aggregated particles are readily produced by pressure crystallization when the pressure applied to the sliding part is high, or when the portion of the sliding part where pressure is applied is large. Furthermore, when the concentration of fullerenes in the polishing-agent composition is higher, fullerene-aggregated particles are more readily produced by pressure crystallization and harder to re-dissolve, so that a higher content of fullerene-aggregated particles tends to be kept in the polishing-agent composition. If these are reversed, the content of fullerene-aggregated particles becomes low. Polishing is done fast when the content of fullerene-aggregated particles is high, and done slowly when the content of fullerene-aggregated particles is low.

Generally, polishing-agent particles decay during use, and their polishing performance deteriorates. However, in the present embodiment, as mentioned earlier, fullerene-aggregated particles keep being produced and disappearing, so that polishing is done by constantly using new polishing-agent particles, and, as a result of that, polishing can be performed stably.

(Polishing-Agent Composition)

The polishing-agent composition contains fullerenes and a solvent of the fullerenes. The concentration of fullerenes in the polishing-agent composition may be any level as long as fullerene-aggregated particles can be obtained by pressure crystallization. A concentration at which a sufficient number of fullerene-aggregated particles for desired polishing can be obtained is preferable.

For example, when high pressure is applied to the sliding part, such as when the material of the sliding part contains a metal, fullerene-aggregated particles may be produced even when the concentration of fullerenes in the polishing-agent composition is 1/50 of the saturating solubility (see reference example 2, which will be described later). In addition, even when the pressure applied to the sliding part is low, such as when the material of the sliding part contains a resin, fullerene-aggregated particles are produced insofar as the concentration of fullerenes is close to the saturating solubility (see reference example 1, which will be described later). That is, the concentration of fullerenes in the polishing-agent composition at which fullerene-aggregated particles are produced should normally range from approximately 1/50 to 1/1 of the saturating solubility. Note that the saturating solubility is measured based on the methods of the examples described later.

The pressure applied to the sliding part can be used as a basis for adjusting the concentration of fullerenes in the polishing-agent composition, but, preferably, 1/40 to 1/2 of the saturating solubility may be a more general approximate of the concentration of fullerenes for machine devices, and 1/30 to 1/5 of the saturating solubility is even more preferable.

Note that, if the concentration of fullerenes in the polishing agent composition is high enough (for example, equal to the saturating solubility), fullerene-aggregated particles can be obtained whether the pressure applied to the sliding part is low or high. However, to control polishing more precisely, it is preferable to perform polishing at a more controllable speed. It is preferable to adjust the content of fullerene-aggregated particles in the polishing-agent composition by adjusting the concentration of fullerenes according to the purpose of polishing.

The polishing-agent composition may contain polishing-agent particles other than fullerene-aggregated particles produced as described above. Polishing-agent particles other than fullerene-aggregated particles are less likely to grow by involving fullerene-aggregated particles that are produced. That is, preferably, the polishing-agent composition contains no fullerene-aggregated particles before polishing is started. Note that, if 10 g of the polishing-agent composition is filtered through a membrane filter having a filter pore size of 0.1 μm and no fullerene-aggregated particles are observed on the membrane filter, it can be assumed that no fullerene-aggregated particles are contained.

(Fullerenes)

For the fullerenes in the polishing-agent composition, various types of fullerenes can be used. Examples of such fullerenes contain $C_{60}$ and $C_{70}$, which are relatively easy to obtain, fullerenes of higher orders, or a mixture of these fullerenes. Of these fullerenes, $C_{60}$ and $C_{70}$ are preferable from the standpoint of solubility in solvents and availability, and $C_{60}$ is more preferable from the standpoint that it colors the solvent less and makes the deterioration of polishing-agent compositions obtained therefrom more noticeable by color. When a mixture of fullerenes is used, it is preferable if the mixture of fullerenes contains 50% or more of $C_{60}$ by weight.

(Solvent)

The solvent is a solvent for fullerenes. That is, any solvent can be used as long as fullerenes can be dissolved. For the solvent, it is preferable to use lubricating oil or its base oil, provided that the solvent is used in a sliding part in a machine device, and, for example, mineral oil, chemically-synthesized oil, and the like may be used. To be more specific, examples of mineral oil include paraffin oil, naphthenic oil, and so forth. Examples of synthetic oil include synthetic hydrocarbon oil, ether oil, ester oil, and so forth. Among these, naphthenic oil, ether oil, and ester oil are preferable from the standpoint of the solubility of fullerenes. One type of solvent may be used alone, or two or more types selected from these may be mixed in any ratio of choice and used.

(Control of Polishing)

As described above, the production of fullerene-aggregated particles can be controlled according to various conditions. For example, the production of fullerene-aggregated particles may be controlled such that fullerene-aggregated particles are produced while polishing is in progress, and not produced after polishing is finished. In this case, since no more fullerene-aggregated particles are produced after polishing is finished, the polishing-agent composition may be used as lubricating oil as is, or may be diluted with a diluting solvent and used as lubricating oil in this state. Note that the diluting solvent is preferably the same as the solvent used for the polishing-agent composition described above. When using the polishing-agent composition as lubricating oil, the solvent and the diluting solvent contained in the polishing-agent composition are preferably the above-mentioned lubricating oil or its base oil, from the standpoint of obtaining good lubricating performance.

(Finishing Polishing Based on Surface Roughness)

The coarser the surface roughness of the sliding surface, the greater the portion of the sliding surface where high pressure is applied while the sliding surface slides, and thus fullerene-aggregated particles are easier to be produced by pressure crystallization, and the polishing speed becomes faster. In contrast to the above, when the sliding surface is smooth, for the opposite reason, fullerene-aggregated particles are not produced, and the polishing-agent composition can be used as lubricating oil.

For example, it is preferable to adjust the concentration of fullerenes in the polishing-agent composition such that, while polishing is in progress, fullerene-aggregated particles are produced where the surface roughness of the sliding part is larger than a target value, and no fullerene-aggregated particles are produced where the surface roughness of the sliding part is less than or equal to the target value. Whether or not a fullerene-aggregated particles are produced can be checked based on whether or not fullerene-aggregated particles remain on the membrane filter when 10 g of the polishing-agent composition is filtered through a membrane filter having a filter pore size of 0.1 µm, or by counting the number of such remaining fullerene-aggregated particles.

After polishing is started, a sliding part having a surface roughness of a target value can be readily obtained by continuing the polishing until no more fullerene-aggregated particles are produced in the polishing-agent composition.

(Finishing Polishing by Dilution)

The polishing-agent composition applied to the sliding part is diluted with a diluting solvent, and the concentration of fullerenes in the obtained dilution is lowered to a degree (for example, less than 1/50 of the saturating solubility) where no fullerene-aggregated particles are produced, and thereupon polishing is finished. Note that, when the concentration of fullerenes is expressed based on saturating solubility, the concentration in the polishing-agent composition may be expressed based on the saturating solubility in the polishing-agent composition as 1, and the concentration in the dilution of the polishing-agent composition may be expressed based on the saturating solubility in the dilution as 1.

It is preferable if the diluting solvent is the same as the solvent contained in the polishing-agent composition, because the concentration of fullerenes with respect to the saturating solubility can be lowered in proportion to the dilution ratio. When using a diluting solvent that is different from the solvent contained in the polishing-agent composition, it is preferable if the solubility of the diluting solvent is higher than or equal to the solubility of the solvent contained in the polishing-agent composition, because the concentration of fullerenes with respect to the saturating solubility can be lowered by more than equal to a ratio corresponding the dilution ratio.

(Machine Device Manufacturing Method)

In the manufacturing process of a machine device having a sliding part, the above-described polishing method can be suitably applied to the polishing of the sliding part.

(Machine Device)

The machine device of this embodiment has a sliding part, and a polishing-agent composition containing fullerenes and a solvent of the fullerenes is applied to the sliding part. The sliding part of the machine device is polished as the sliding part slides. As described earlier in "Finishing polishing based on surface roughness," this polishing may be conditioned such that the polishing is continued and finished automatically, and, upon finishing the polishing, the polishing-agent composition is in a state for use as lubricating oil for the sliding part. For example, the machine device may be shipped in a state in which the sliding part is not polished and, after the user starts using the machine device, the polishing of the sliding part may be completed after the so that the completed machine has its originally-intended performance.

Although a preferred embodiment of the present invention has been described in detail above, the present invention is by no means limited to a specific embodiment, and a variety of alterations and changes are possible within the scope of the gist of the present invention described in the claims.

EXAMPLES

Although the present invention will be described below in more detail with reference to further examples and comparative examples, the present invention is by no means limited to the following examples.

Measurement Method:

(Measurement of Fullerene Concentration)

Using a high-performance liquid chromatograph (1200 series produced by Agilent Technologies Co., Ltd.) under the following conditions, the number of fullerenes in a sample such as a polishing-agent composition was quantified, and the concentration of fullerenes (hereinafter also referred to as "fullerene concentration") was measured:

Column: YMC-pack ODS-AM (150 mm×4.6 mm) produced by YMC Co., Ltd.

Developing solvent: 1:1 (volume ratio) mixed solvent of toluene and methanol.

Detection: absorbance (wavelength 309 nm)

Note that, when solid matter was contained in the sample, the solid matter was removed by filtering the sample in advance with a membrane filter having a filter pore size of 0.1 µm. Also, the calibration curve was prepared by the fullerenes used to prepare the sample.

(Measurement of Saturating Solubility)

Fullerenes and a solvent for measuring the saturating solubility were prepared. The fullerenes were mixed in 10 g of the solvent, and the mixture was stirred at room temperature for 36 hours using a magnetic stirrer. Next, this mixture was filtered through a membrane filter having a filter pore size of 0.1 µm, and a filtrate was obtained. The fullerene concentration in this filtrate was measured. This measurement was performed several times at different fullerene mixture ratios.

As for the number of fullerenes to mix, the amount at which the saturating solubility is expected to be reached and multiples of that amount were used as gauges for measuring the number of fullerenes to mix. For example, in the case of fullerenes and mineral oil used in example 1, which will be described later, the number of fullerenes to mix was 0.03 g, 0.06 g, and 0.12 g.

When the fullerene concentration in the filtrate no longer increased by increasing the number of fullerenes to mix, this concentration was defined as saturating solubility.

Note that all the examples described hereinafter were tested at room temperature (about 20 degrees Celsius), and all the above operations were also performed at room temperature. If the temperature of the polishing-agent composition to use for the machine device is known in advance, it is preferable to perform the above measurement at that temperature, because the error in the saturating solubility obtained is reduced.

(Measurement of Surface Smoothness)

Using a stylus-type surface roughness meter, namely Alpha-Step D-500, Rz (maximum height) at a measurement length of 1 mm was measured at 5 points of choice on the measurement surface, and the arithmetic mean value of total 5 measured values was used as the surface smoothness.

(Confirmation of Fullerene-Aggregated Particles)

10 g of sample was filtered through a membrane filter having a filter pore size of 0.1 μm, and the number of fullerene-aggregated particles that remained on the membrane filter was counted.

Note that, when the fullerene concentration in the sample is less than or equal to the saturating solubility, the number of fullerene-aggregated particles decreases over time, and so the operation up to filtering was performed as quickly as possible. Even then, the accuracy of numerical values that are obtained is not high, and so the number of digits is shown in each table.

Reference Example 1: (Confirmation 1 of Fullerene-Aggregated Particles by Pressure Crystallization)

1 g of fullerenes ($C_{60}$, which is Nanom™ purple ST produced by Frontier Carbon Co., Ltd.) was mixed in a solvent of 100 g of mineral oil (Diana Fresia P-46, produced by Idemitsu Kosan Co., Ltd.), and the mixture was stirred at room temperature for 36 hours using a stirrer. Next, a saturated solution was prepared by filtering the mixture with use of a membrane filter having a filter pore size of 0.1 μm. The fullerene concentration in the saturated solution was 0.3%.

A pressure cell filled with the saturated solution was installed as a sample in an anvil produced by Syntek Co., Ltd. Before pressure was applied, no solid matter was found on the microscopic image. Next, when slight pressure (<0.01 GPa) was applied, solid matter was found. Next, when the pressure was lowered until normal pressure was resumed, the solid matter disappeared gradually, and disappeared completely after 10 minutes.

Reference Example 2: (Confirmation 2 of Fullerene-Aggregated Particles by Pressure Crystallization)

As a sample, a mixture of 1 part by weight of the saturated solution of reference example 1 and 49 parts by weight of the mineral oil of reference example 1 was obtained. The fullerene concentration in this sample was 1/50 of the saturating solubility. A pressure cell filled with the sample was installed in the Syntek anvil. Before pressure was applied, no solid matter was found on the microscopic image. Next, when the pressure was applied gradually, solid matter was found approximately at 1 GPa. Then, when the pressure was lowered until normal pressure was resumed, the solid matter disappeared immediately.

Examples 1 to 5

(Preparation of Polishing-Agent Composition)

0.07 g of fullerenes ($C_{60}$, which is NP-ST produced by Frontier Carbon Corporation) was mixed in a solvent of 100 g of mineral oil (Diana Fresia P-46, produced by Idemitsu Kosan Co., Ltd.), and the mixture was stirred at room temperature for 24 hours using a magnetic stirrer. Next, a filtrate was obtained by filtering this mixture with use of a membrane filter having a filter pore size of 0.1 μm.

The fullerene concentration in the filtrate was 0.06% by weight. Furthermore, since the saturating solubility of the fullerenes in the mineral oil was 0.3%, the fullerene concentration in the filtrate corresponded to 1/5 of the saturating solubility.

In example 1, the obtained filtrate was used as a polishing-agent composition in the next polishing step.

Furthermore, in each of examples 2 to 5, the filtrate was diluted with the mineral oil contained in the filtrate to obtain a polishing-agent composition having the fullerene concentration shown in Table 1, and the polishing-agent composition was used in the next polishing step.

Fullerene-aggregated particles in the obtained polishing-agent composition were checked, and none were found in all of examples 1 to 5. The results are shown in Table 1.

(Polishing Process)

Figure 1:
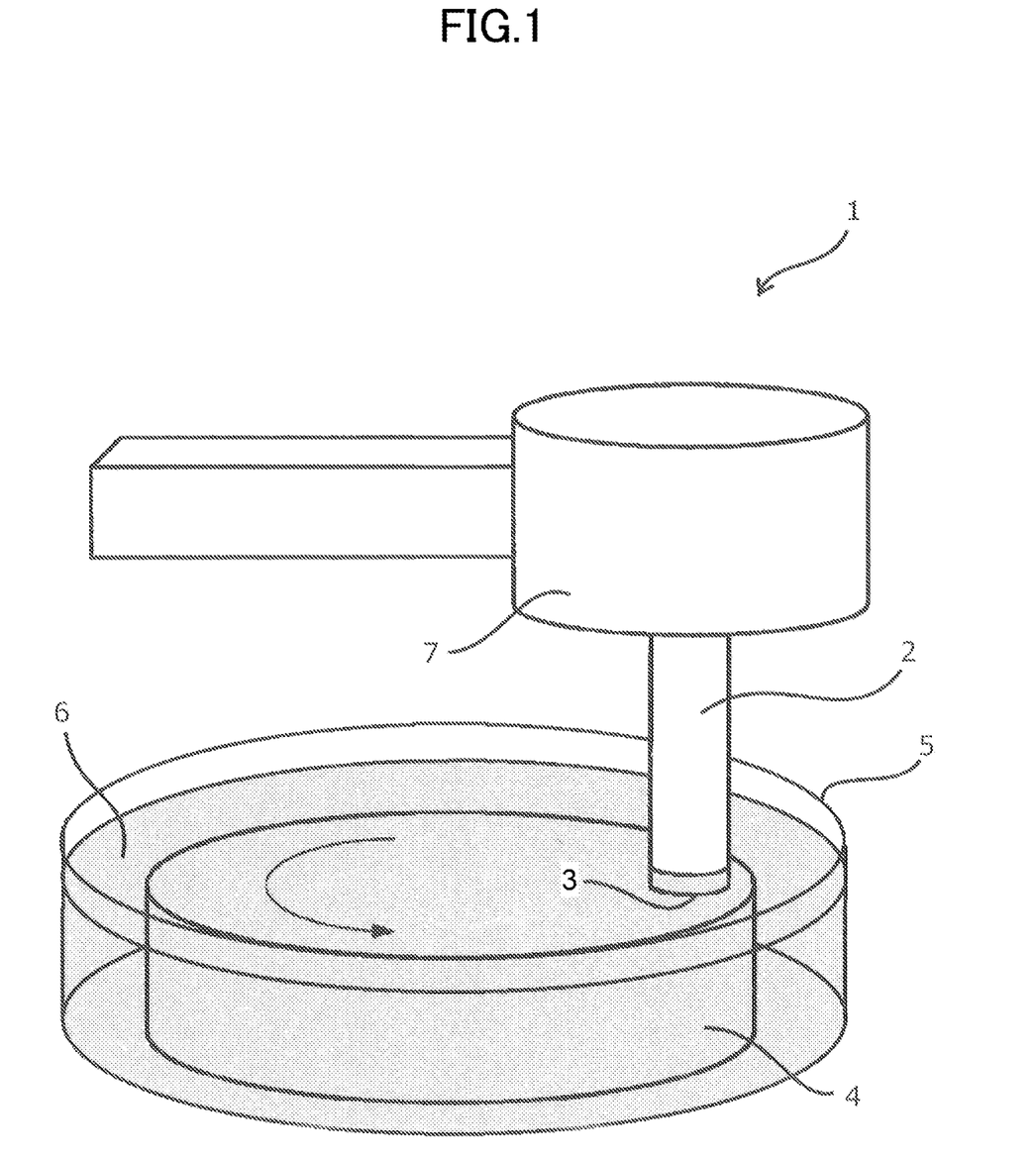
FIG. 1 is a diagram for describing a frictional wear testing machine used in an embodiment.

Next, as shown in FIG. 1, using a friction wear testing machine 1 (product name: ball-on-disc tribometer, produced by Anton Paar), the end surface of a cylindrical metal pin 2 (material SUJ, 2 mm in diameter, and 20 mm long) was pressed against a metal substrate 4 (material SUJ2, 25 mm in diameter, and 5 mm thick), and their contact surface was used as a sliding surface 3. The metal substrate 4 was placed in a petri dish 5 attached to the frictional wear testing machine 1.

Prior to polishing, the surface smoothness of the portion of the metal substrate 4 that served as the contact surface was measured in advance. The results are shown in Table 1.

Next, 50 g of a polishing-agent composition 6 was put in the petri dish 5. In this state, the metal substrate 4 was submerged in the polishing-agent composition 6. This corresponded to a state in which the polishing-agent composition was applied to the sliding part of the machine device.

Next, the metal substrate 4 was rotated such that the metal pin 2 would draw concentric tracks on one main surface of the metal substrate 4. The speed of the metal pin 2 on one main surface of the metal substrate 4 was 1 cm/sec, the load of the metal pin 2 on one main surface of the metal substrate 4 was 5 N, and the sliding distance was 1 m. This state corresponded to a state in which sliding surfaces of the sliding part of the machine device were rubbed against each other and polished.

The rotation of the metal substrate 4 was stopped, and, shortly after that, the fullerene-aggregated particles in the polishing-agent composition 6 were checked. The results are shown in table 1.

In addition, the surface smoothness of the sliding surface of the metal substrate 4 taken out from the frictional wear testing machine 1 after polishing was measured. The results are shown in Table 1.

(Vibration Test)

Next, the polishing-agent composition 6 in the petri dish 5 was removed using a dropper, and only 5 g was left. Next, the metal substrate 4 was placed again in the petri dish 5 of the frictional wear testing machine 1.

45 g of mineral oil (Diana Fresia P-46, produced by Idemitsu Kosan Co., Ltd.) as a diluting solvent was added to the petri dish 5 and mixed. In this state, 5 g of the remaining polishing-agent composition was diluted to 1/10 with 45 g of mineral oil. The fullerene concentration in this dilution 6 is shown in Table 1.

Figure 2:
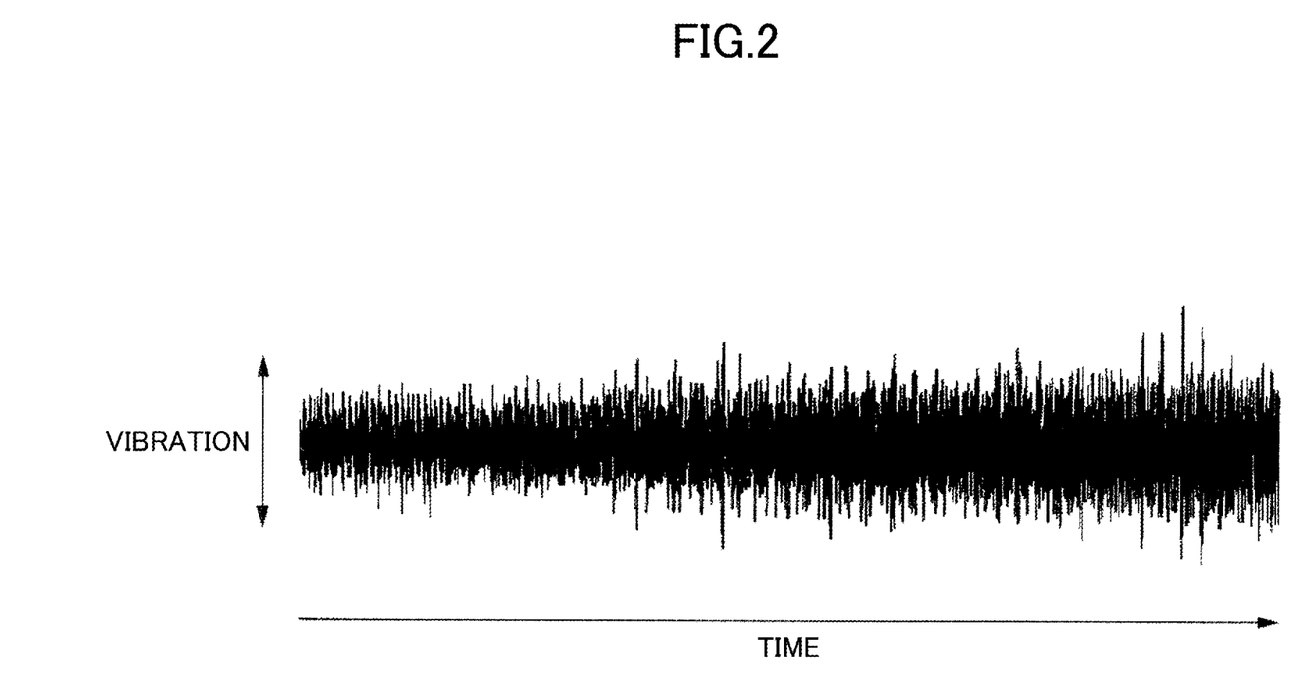
FIG. 2 is a diagram illustrating an example of a signal captured from an acoustic emission device used in a vibration test.

Next, in the same manner as in the polishing step, the metal substrate 4 was rotated such that the metal pin 2 would draw concentric tracks on one main surface of the metal substrate 4. At this time, the metal pin 2 slid over the same portion as the sliding portion of the metal substrate 4 in the polishing step. Furthermore, the load on one main surface of the metal substrate 4 by the metal pin 2 was set to 10 N. Then, using an acoustic emission (AE) device (pocket AE, produced by Nippon Physical Acoustics, LTD.), a detection unit 7 of the AE device was brought into contact with the pin, and the vibration produced by the sliding surface was measured. To be more specific, the average amplitude of the signals (see, for example, FIG. 2) taken in from the AE in the range of the sliding distance of 5 to 15 m was measured. The average amplitude value was a relative value with respect to the average amplitude measured in comparative example 1, which will be described later. The measurement results are shown in Table 1.

Comparative Example 1

The same operation and measurement were performed as in example 1, except that a polishing-agent composition having a fullerene concentration of 0, that is, mineral oil (Diana Fresia P-46, produced by Idemitsu Kosan Co., Ltd.) was used for the polishing-agent composition. The results are shown in Table 1.

The lubricating agent composition or its dilution will act as lubricating oil when it no longer contains fullerene-aggregated particles.

Examples 6 to 8

(Preparation of Polishing-Agent Composition)

0.3 g of fullerenes (Nanom™ mix ST, which is a mixture containing $C_{60}$, $C_{70}$, and fullerenes of higher orders, produced by Frontier Carbon Corporation) was mixed in a solvent of 100 g of polyoxyethylene (polyol-ester-type UNISTER™ H-334R, produced by NOF CORPORATION), and the mixture was stirred at room temperature for 24 hours using a magnetic stirrer. Next, a filtrate was obtained by filtering this mixture with use of a membrane filter having a filter pore size of 0.1 μm.

The fullerene concentration in the filtrate was 0.1% by weight. Also, the saturating solubility of fullerenes in polyoxyethylene (hereinafter also referred to as "POE") was 0.1% by weight.

In example 6, the obtained filtrate was used as a polishing-agent composition in the next polishing step. Furthermore, in each of examples 7 and 8, the filtrate was diluted with POE to the fullerene concentrations shown in Table 2, and the polishing-agent composition was used in the next polishing step.

Fullerene-aggregated particles in the obtained polishing-agent composition were checked, and none were found in all of the examples. The results are shown in Table 2.

TABLE 1

| | Polishing-agent composition | | Polishing step | | Vibration test | | |
|---|---|---|---|---|---|---|---|
| | Fullerene concentration *1 | Fullerene-aggregated particles (number) | Surface smoothness before polishing | Surface smoothness after polishing *2 | Fullerene-aggregated particles shortly after polishing (number) | Fullerene concentration *1 | Fullerene-aggregated particles shortly after vibration test (number) | Average amplitude *3 |
| Example 1 | 1/5 | 0 | 1.1 | 0.5 | >$10^3$ | 1/50 | $10^1$ | 0.65 |
| Example 2 | 1/10 | 0 | 1.1 | 0.4 | >$10^3$ | 1/100 | 0 | 0.54 |
| Example 3 | 1/20 | 0 | 1.1 | 0.7 | >$10^3$ | 1/200 | 0 | 0.59 |
| Example 4 | 1/40 | 0 | 1.1 | 0.8 | $10^2$ | 1/400 | 0 | 0.64 |
| Example 5 | 1/50 | 0 | 1.1 | 0.9 | $10^1$ | 1/500 | 0 | 0.79 |
| Comparative Example 1 | 0 | 0 | 1.1 | 1.0 | 0 | 0 | 0 | 1.00 |

*1 Relative value with respect to the saturating solubility as concentration 1.
*2 Relative value with respect to the post-polishing surface smoothness of comparative example 1 as 1.0.
*3 Relative value with respect to the average amplitude measured in comparative example 1 as 1.00.

Fullerene-aggregated particles were produced while the polishing was in progress, but Table 1 shows that the polishing can be finished by diluting the polishing-agent composition, lowering the fullerene concentration, and eliminating the fullerene-aggregated particles (examples 2 to 5).

There is a possibility that the average amplitude in example 1 was slightly larger than that of example 2 because fullerene-aggregated particles remained even after the polishing-agent composition was diluted. Nevertheless, the fullerene-aggregated particles decreased more than the dilution ratio of the polishing-agent composition. Furthermore, the remaining fullerene-aggregated particles can be eliminated in this way, as also shown in example 11 described later.

(Polishing Process)

Next, the polishing step was performed based on the same operation and measurement as in example 1. The results are shown in Table 2.

(Vibration Test)

Next, a vibration test was performed based on the same operation and measurement as in example 1, except that poly-α-olefin (hereinafter also referred to as "PAO") (produced by JX Nippon Oil Co., Ltd.) was used as the diluting solvent, instead of mineral oil. The saturating solubility of fullerenes in the mixture of 1 part by weight of POE and 9 parts by weight of PAO was 0.2% by weight. The results are shown in Table 2.

Comparative Example 2

The same operation and measurement were performed as in example 6, except that a polishing-agent composition having a fullerene concentration of 0, that is, polyoxyethylene (polyol-ester-type UNISTER™ H-334R, produced by NOF CORPORATION), was used as the polishing-agent composition. The results are shown in Table 2.

TABLE 2

| | Polishing-agent composition | | Polishing step | | | Vibration test | | |
|---|---|---|---|---|---|---|---|---|
| | Fullerene concentration *1 | Fullerene-aggregated particles (number) | Surface smoothness before polishing | Surface smoothness after polishing *2 | Fullerene-aggregated particles shortly after polishing (number) | Fullerene concentration *1 | Fullerene-aggregated particles shortly after vibration test (number) | Average amplitude *3 |
| Example 6 | 1 | 0 | 1.1 | 0.6 | $>10^3$ | 1/20 | $10^2$ | 0.85 |
| Example 7 | 1/10 | 0 | 1.1 | 0.4 | $>10^3$ | 1/200 | 0 | 0.50 |
| Example 8 | 1/40 | 0 | 1.1 | 0.8 | $>10^2$ | 1/800 | 0 | 0.55 |
| Compartive example 20 | 0 | 0 | 1.1 | 1.0 | 0 | 0 | 0 | 0.90 |

*1 Relative value with respect to the saturating solubility as concentration 1.
*2 Relative value with respect to the average amplitude measured in comparative example 1 as 1.00.
*3 Relative value with respect to the post-polishing surface smoothness of comparative example 2 as 1.0.

Tables 1 and 2 show that the results show the same tendency even if the solvent is different.

Example 9

In example 9, the same operation and measurement were performed as in example 2, except that the material of the cylindrical metal pin 2 was aluminum AC8, instead of SUJ2. The results are shown in Table 3.

Comparative Example 3

The same operation and measurement were performed as in example 9, except that a polishing-agent composition having a fullerene concentration of 0, that is, mineral oil, was used as the polishing-agent composition. The results are shown in Table 3.

TABLE 3

| | Polishing-agent composition | | Polishing step | | | Vibration test | | |
|---|---|---|---|---|---|---|---|---|
| | Fullerene concentration *1 | Fullerene-aggregated particles (number) | Surface smoothness before polishing | Surface smoothness after polishing *5 | Fullerene-aggregated particles shortly after polishing (number) | Fullerene concentration *1 | Fullerene-aggregated particles shortly after vibration test (number) | Average amplitude *3 |
| Example 9 | 1/10 | 0 | 1.1 | 0.9 | $>10^3$ | 1/100 | 0 | 0.70 |
| Comparative example 3 | 0 | 0 | 1.1 | 1.0 | 0 | 0 | 0 | 1.40 |

*1 Relative value with respect to the saturating solubility as concentration 1.
*2 Relative value with respect to the average amplitude measured in comparative example 1 as 1.00.
*3 Relative value with respect to the post-polishing surface smoothness of comparative example 3 as 1.0.

Example 10

In example 10, the same operation and measurement were performed as in example 2, except that the material of the cylindrical metal pin 2 was changed from SUJ2 to Teflon™, and the material of the metal substrate 4 was changed from SUJ2 to titanium. The results are shown in Table 4.

Comparative Example 4

The same operation and measurement were performed as in example 10, except that a polishing-agent composition having a fullerene concentration of 0, that is, mineral oil, was used as the polishing-agent composition. The results are shown in Table 4.

TABLE 4

| | Polishing-agent composition | | | | Polishing step | | Vibration test | | |
|---|---|---|---|---|---|---|---|---|---|
| | Fullerene concen- tration *1 | Fullerene- aggregated particles (number) | Surface smoothness before polishing | Surface smoothness after polishing *2 | Fullerene- aggregated particles shortly after polishing (number) | Fullerene concen- tration *1 | Fullerene- aggregated particles shortly after vibration test (number) | Average amplitude *3 |
| Example 10 | 1/10 | 0 | 2.0 | 0.9 | >10³ | 1/100 | 0 | 0.4 |
| Compartive example 4 | 0 | 0 | 2.0 | 1.8 | 0 | 0 | 0 | 1.2 |

*1 Relative value with respect to the saturating solubility as concentration 1.
*2 Relative value with respect to the post-polishing surface smoothness of comparative example 1 as 1.0.
*3 Relative value with respect to the average amplitude measured in comparative example 1 as 1.00.

Tables 1, 3, and 4 show that, when the polishing-agent composition of this example is used, polishing can be performed well if the material of the sliding part is different, and that the polishing can be finished by mitigating the production of fullerene-aggregated particles by dilution.

Example 11

The same vibration test was performed as in example 1, except that the range of the sliding distance measured in the vibration test was set to the range shown in Table 5. The results are shown in Table 5.

TABLE 5

| | Vibration test | | | |
|---|---|---|---|---|
| | Range of measured sliding distance (m) | Fullerene concentration *1 | Fullerene- aggregated particles shortly after vibration test (number) | Average amplitude *3 |
| Example 1 | 5 to 15 | 1/50 | 10¹ | 0.57 |
| Example 11 | 90 to 100 | 1/50 | 0 | 0.53 |

*1 Relative value with respect to the saturating solubility as concentration 1.
*2 Relative value with respect to the average amplitude measured in comparative example 1 as 1.00.

Table 5 shows that, even if fullerene-aggregated particles remain at the initial stage (example 1) of the vibration test, these fullerene-aggregated particles will disappear by continuing the vibration test (example 11).

Example 12

The same vibration test was performed as in example 4, except that, when moving from the polishing step to the vibration test, the vibration test was performed on an as-is basis, without diluting the polishing-agent composition, and that the range of the sliding distance measured in the vibration test was set to the range shown in Table 6. That is, in the vibration test of example 12, the polishing test was continued in effect. The results are shown in Table 6.

TABLE 6

| | Vibration test | | | |
|---|---|---|---|---|
| | Range of measured sliding distance (m) | Fullerene concentration *1 | Number of fullerene- aggregated particles shortly after vibration test (number) | Average amplitude *3 |
| Example 4 | 5 to 15 | 1/400 | 0 | 0.64 |
| Example 12 | 90 to 100 | 1/40 | 0 | 0.55 |

*1 Relative value with respect to the saturating solubility as concentration 1.
*3 Relative value with respect to the average amplitude measured in comparative example 1 as 1.00.

Table 6 shows that, as the polishing of the sliding surface progresses and the surface becomes smoother (as the average amplitude becomes smaller), fullerene-aggregated particles are produced less, without diluting the polishing-agent composition. That is, by adjusting the fullerene concentration in the polishing-agent composition, polishing can be finished when the target surface roughness is reached.

On the other hand, as long as the target surface roughness is not reached, fullerene-aggregated particles continue being produced, so that polishing can be performed stably during that time. Note that the polishing-agent composition after polishing is used as lubricating oil as described above.

INDUSTRIAL APPLICABILITY

The present invention is useful for machine devices having a sliding part between parts, such as industrial products, industrial machines, industrial equipment, and so forth. In particular, the present invention is suitable for use for machine devices having large sliding parts such as reciprocating engines, machine devices with many sliding parts such as transmission constituted by many gears, and so forth.

This application is based on and claims priority to Japanese Patent Application No. 2019-230213, filed with Japan Patent Office on Dec. 20, 2019, the entire contents of which are incorporated herein by reference.

DESCRIPTION OF THE REFERENCE NUMERALS

1 Friction wear testing machine
2 Metal pin
3 Sliding surface
4 Metal substrate
5 Petri dish
6 Polishing-agent composition or dilution
7 Detection unit of acoustic emission device

The invention claimed is:

1. A polishing method comprising polishing a sliding part of a machine device by producing fullerene-aggregated particles by making the sliding part slide while a polishing-agent composition containing fullerenes and a solvent of the fullerenes is applied to the sliding part,
wherein the solvent is mineral oil or chemically-synthesized oil, and
wherein a concentration of the fullerenes in the polishing-agent composition is adjusted such that, while the polishing is in progress, the fullerene-aggregated particles are produced when a surface roughness of the sliding part is greater than a target value and not produced when the surface roughness of the sliding part is less than or equal to the target value.

2. The polishing method according to claim 1, wherein a concentration of the fullerenes in the polishing-agent composition is 1/50 to 1/1 of saturating solubility.

3. The polishing method according to claim 1, wherein the polishing-agent composition contains the fullerene-aggregated particles only after the polishing is started.

4. The polishing method according to claim 1, wherein the polishing is finished by diluting the polishing-agent composition applied to the sliding part, with a diluting solvent, and reducing the concentration of the fullerenes.

5. The polishing method according to claim 4, wherein the diluting solvent is same as a solvent contained in the polishing-agent composition.

6. The polishing method according to claim 1, wherein a material of the sliding part contains a resin.

7. The polishing method according to claim 1, wherein the material of the sliding part contains a metal.

8. A polishing method comprising polishing a sliding part of a machine device by producing fullerene-aggregated particles by making the sliding part slide while a polishing-agent composition containing fullerenes and a solvent of the fullerenes is applied to the sliding part,
wherein the solvent is mineral oil or chemically-synthesized oil, and
wherein, after the polishing is started, the polishing is performed until the fullerene-aggregated particles are no longer produced in the polishing-agent composition.

* * * * *